US012067109B2

(12) United States Patent
Lingala et al.

(10) Patent No.: US 12,067,109 B2
(45) Date of Patent: Aug. 20, 2024

(54) METHODS AND SYSTEMS FOR MANAGING ACCESS OF AN APPLICATION

(71) Applicant: CARRIER CORPORATION, Palm Beach Gardens, FL (US)

(72) Inventors: Ramesh Lingala, Hyderabad (IN); Gowthami Vuradi, Hyderabad (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 234 days.

(21) Appl. No.: 17/255,158

(22) PCT Filed: May 20, 2020

(86) PCT No.: PCT/IB2020/054782
§ 371 (c)(1),
(2) Date: Dec. 22, 2020

(87) PCT Pub. No.: WO2020/254888
PCT Pub. Date: Dec. 24, 2020

(65) Prior Publication Data
US 2022/0188406 A1 Jun. 16, 2022

(30) Foreign Application Priority Data
Jun. 18, 2019 (IN) .............................. 201911024224

(51) Int. Cl.
*G06F 21/54* (2013.01)
*G06F 21/45* (2013.01)
(52) U.S. Cl.
CPC .............. *G06F 21/54* (2013.01); *G06F 21/45* (2013.01); *G06F 2221/2105* (2013.01)

(58) Field of Classification Search
CPC .......... G06F 21/31; G06F 21/32; G06F 21/45; G06F 21/54; G06F 2221/21
See application file for complete search history.

(56) References Cited

U.S. PATENT DOCUMENTS 7,360,082 B1 * 4/2008 Berthold ................... H04L 9/12
713/157
9,009,853 B2 * 4/2015 Korycki ................. H04L 67/02
726/29

(Continued)

FOREIGN PATENT DOCUMENTS

JP H0471832 A 3/1992
WO 2014086125 A1 6/2014

OTHER PUBLICATIONS

International Search Report and Written Opinion for Application No. PCT/IB2020/054782, Issued Jun. 18, 2020, 13 Pages.

*Primary Examiner* — Hosuk Song
(74) *Attorney, Agent, or Firm* — CANTOR COLBURN LLP

(57) ABSTRACT

Aspects of the invention are directed towards methods and systems for managing access of an application. One or more embodiments of the invention describe receiving an indication from a user to access an application. One or more embodiments of the invention further describe determining whether a user device is in an offline mode and if the user device is in the offline mode, prompting the user to input user credentials. Furthermore, the embodiments of the invention also describe receiving the user credentials from the user and validating the user credentials of the user with pre-stored user credentials. Accordingly, access of the application to the user is controlled based on said validation.

20 Claims, 4 Drawing Sheets

(56) References Cited

U.S. PATENT DOCUMENTS

| | | | | |
|---|---|---|---|---|
| 9,883,381 | B1* | 1/2018 | Katzer | H04W 12/126 |
| 10,404,707 | B2* | 9/2019 | Martinelli | H04L 63/101 |
| 10,785,315 | B2* | 9/2020 | Singhal | H04L 67/01 |
| 11,032,350 | B2* | 6/2021 | Sinha | G06F 9/54 |
| 2013/0247165 | A1 | 9/2013 | Pal | |
| 2016/0127372 | A1 | 5/2016 | Unterschuetz | |

* cited by examiner

METHODS AND SYSTEMS FOR MANAGING ACCESS OF AN APPLICATION

CROSS-REFERENCE TO RELATED APPLICATIONS

This application is a National Stage Application of PCT/IB2020/054782, filed May 20, 2020, which claims priority to India Application No. 201911024224, filed Jun. 18, 2019, both of which are incorporated herein by reference in their entirety.

TECHNICAL FIELD OF INVENTION

The present invention relates generally to security. More particularly, the invention relates to systems and methods for managing access to an application.

BACKGROUND OF THE INVENTION

Currently, there are numerous applications available in the market intended to provide one or more services to users of user devices. These services may be protected by several levels of authorization to prevent an unauthorized user from using the service.

The first level of authorization is a device-wide control of all access of the user device by, for example, a directly entered password, fingerprint, or other biometric such as face recognition. But the applications and thus, the services can be accessed easily if the user device access control has been disabled or if the user device is found that is currently unlocked and authorized.

The next level of control is where some of the applications further mandate the use of basic security features in the applications such as requiring an additional password or PIN code. Again, once authorized, the rest of the applications can be easily used without any such security features. The reason for offering the mandatory security features in the applications is to protect confidential and sensitive data/information of the application even if the user device is unlocked. These security features then prevent the misuse of the data/information of the application by any unauthorized user. However, these security features are all-or nothing for the application and service.

So, another level of control used to enhance security and prevent misuse of the application is to additionally require use of keys/codes for certain functionalities of the application or for accessing the application. Such keys/codes are provided to the user of the application which are valid only for a specific period of time. These keys/codes are generated by a server of the application and provided to the user or to the application. In other words, these keys/codes get changed after an expiration of the specific period of time. For instance, the keys/codes are valid for only every 24 hours or 48 hours and get changed after the expiration of the 24 hours or 48 hours as the case may be. Such period of time is defined by a developer/owner of the application providing the services to the user. The user of the application can request a server of the application every 24 hours or 48 hours to provide new keys/codes for the application. Alternatively, the server may automatically provide the keys/codes to the user after a predetermined period. Subsequently, the server provides the new keys/codes to the user and the user receives the new keys/codes for the application. If the new keys/codes are not provided, then the application will not be able to provide the service after the specific period of time.

Another level of control may be needed when considering that during the time period when an application is authorized by keys/codes, the user device may continue to operate for that specified period of time. So in the event the user device is lost or reported missing, an additional level of control may be a push notification sent to the user device to disable the application or for the application to periodically check with the server to see if it should continue to operate. This final level of control requires frequent connectivity to a network.

Considering a situation when a user device with the application installed in it gets stolen and an unauthorized user tries to access or open the application. In such a situation, the unauthorized user may easily put the user device in the airplane mode or turn off the internet of the user device so that the application would not receive push notifications or be able to check the server and the current keys/codes continue to allow the user device and application to operate for the predetermined period or interval. Further, by using the current keys/codes of the application and bypassing the initial basic security feature (like Password, PIN etc.), the unauthorized user gets access to the application. In this situation, the unauthorized user may be able to misuse the application as well as the data/information of the application.

In order to prevent the misuse of the application by the unauthorized user, there is a need of an effective system and method for providing additional security features in the application. There is also a need for restricting the unauthorized user to misuse/access the application. In view of above-mentioned problems, a system and method for managing access of the application are required.

SUMMARY OF THE INVENTION

Various embodiments of the invention describe a system and method for managing access of an application. The invention describes receiving an indication from a user to access the application stored in a memory of a user device. Once the indication is received, the invention determines whether the user device is in an offline mode. Subsequently, the application prompts the user to input user credentials if the user device is in the offline mode and then, the user credentials from the user are received. The received user credentials are validated by comparing the user credentials with a pre-stored user credentials. Accordingly, the access of the application to the user is controlled based on the validation.

In an embodiment of the invention, the offline mode of the user device is an airplane mode or an internet switch-off mode or a network switch-off mode.

In an embodiment of the invention, the user credentials include biometric data, unique identifiers, or password.

In a further embodiment of the invention, the access of the application is granted to the user when the user credentials associated with the user match with the pre-stored user credentials.

In an alternative embodiment of the invention, the access of the application is restricted/denied to the user when the user credentials associated with the user do not match with the pre-stored user credentials.

In a further embodiment of the invention, content of the application can be displayed to the user when the access of the application is granted to the user.

In another embodiment of the invention, some prerequisite of the application for registering a user with the application are disclosed. The registration may include prompting the user to input user credentials, receiving the user credentials from the user, and storing the user credentials of the user in the memory of the user device. A user with successful storing of the user credentials in the memory is referred to as a registered user of the application and the user credentials associated with the registered user of the application are referred as the pre-stored user credentials stored in the memory of the user device.

In another embodiment of the invention, a user device for controlling access of an application is disclosed. The user device comprises an interface configured to receive an indication from a user to access the application stored in a memory of a user device. The user device further comprises a detector adapted to determine whether the user device is in an offline mode on receiving said indication. The user device also comprises a credentials unit adapted to receive user credentials from the user if the user device is in the offline mode and a validation unit adapted to validate the user credentials of the user with a pre-stored user credentials and thereby control access of the application to the user based on said validation.

In an embodiment of the invention, the offline mode of the user device is an airplane mode or an internet switch-off mode or a network switch-off mode.

In a further embodiment of the invention, the validation unit is configured to grant the access of the application to the user when the user credentials associated with the user match with the pre-stored user credentials.

In an alternative embodiment of the invention, the validation unit is configured to restrict the access of the application to the user when the user credentials associated with the user do not match with the pre-stored user credentials.

In a further embodiment of the invention, the interface is configured to display content of the application to the user when the access of the application is granted to the user.

In still another embodiment of the invention, the pre-stored user credentials are associated with a registered user of the application.

In various other embodiments of the invention, a computer readable medium is disclosed comprising one or more processors and a memory coupled to the one or more processors. The memory stores instructions which are executed by the one or more processors to receive an indication from a user to access an application stored in a memory of a user device and determine whether the user device is in an offline mode. Further, the memory stores instructions to prompt the user to input user credentials if the user device is in the offline mode. The memory also stores instructions to receive the user credentials from the user and validate the user credentials of the user with pre-stored user credentials. Accordingly, access of the application is controlled based on said validation.

In an embodiment of the invention, the offline mode of the user device is an airplane mode or an internet switch-off mode or a network switch-off mode.

In a further embodiment of the invention, the access of the application is granted to the user when the user credentials associated with the user matches with the pre-stored user credentials.

In an alternative embodiment of the invention, the access of the application is restricted/denied to the user when the user credentials associated with the user do not match with the pre-stored user credentials.

In a further embodiment of the invention, content of the application can be displayed to the user when the access of the application is granted to the user.

In yet another embodiment of the invention, the pre-stored user credentials are associated with a registered user of the application.

This summary is provided to introduce a selection of concepts in a simplified form those that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Described herein is a technology with a system and a method for managing access of an application by granting or restricting access of the application to a user, wherein the application is stored in a user device.

As used herein, the term "application" refers to a software stored in a memory of the user device and provide one or more functionalities to the user. The application may include, but not limited to, a real estate application, a housing application, a hospitality application, an instant messaging application, a social networking application, service-based application, or any such application that is obvious to a person skilled in the art. Further, the application has capability to interact with multiple user applications in proximity and enable the security feature as described herein.

As used herein, the term "user device" refers to a desktop computer or a hand-held device such as a smartphone with internet connectivity. The internet connectivity may be provided to the user device by a wide area network (WAN), for example cellular network, or by a local area network (LAN), for example WiFi network. The user device may include, but is not limited to, a desktop, workstation PC, a laptop, a smart phone, a tablet, a personal digital assistance, a wearable device, or any such user device that is obvious to a person skilled in the art.

As used herein, the cellular network may be a Global System for Mobile (GSM) network, Long-Term Evolution (LTE) network, a code-division multiple access (CDMA) network or any such network that is obvious to a person skilled in the art.

As used herein, the Wi-Fi network may be a network based on IEEE 802.11 Standards and provided by a WiFi access point. Such network provides coverage within a specified limit.

Figure 1A:
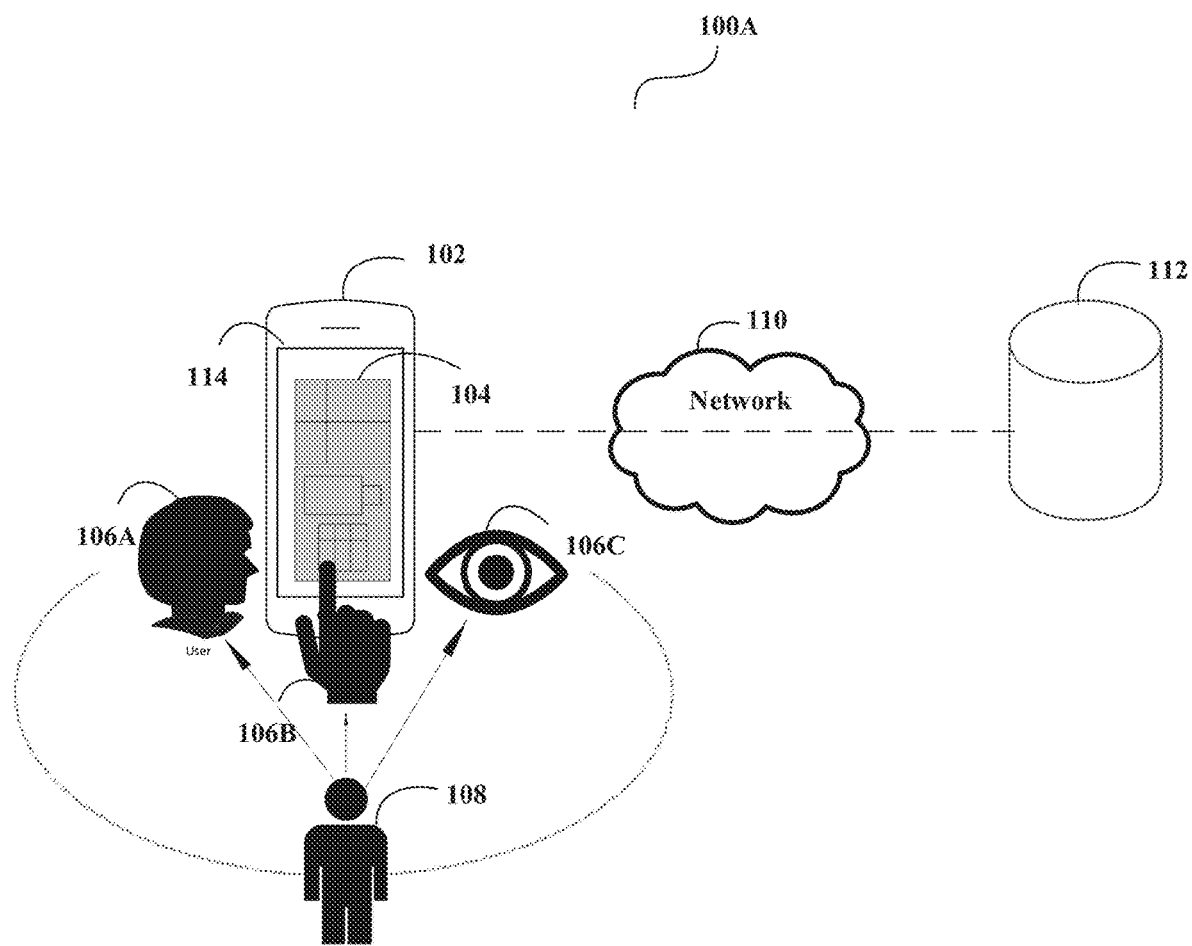
FIG. 1A is an exemplary system architecture illustrating prerequisites for registering a user with an application, according to an exemplary embodiment of the invention.

FIG. 1A depicts a system architecture 100A illustrating prerequisites for registering a user 108 with an application 104 and thereby with a database 112, according to an exemplary embodiment of the invention. As depicted in FIG. 1A, an application 104 is displayed on an interface 114 of a user device 102. Also, the user device 102 is connected with a network 110. The network 110 provides internet connectivity to the user device 102 when enabled on the user device 102 by the user 108. Further, the user 108 can register with the application 104 using the network 110. The user 108 first installs the application 104 on the user device 102 from an application store where the application 104 is listed by a developer of the application 104. Once the application 104 is installed on the user device 102, the user 108 registers with the application 104. Specifically, in order to register with the application 104, the user 108 opens/accesses the application 104 on the interface 114 of the user device 102. Then, the application 104 prompts the user 108 to input user credentials 106A/106B/106C. The user credentials may include, but are not limited to, biometric data, password, unique identifier, PIN number, a fingerprint data, a facial image data, an iris data and any such data that is obvious to a person skilled in the art. Although the drawings are showing biometric user credentials, however, it is well understood for the person skilled in the art that any other user credentials can also be used.

Once the user 108 inputs the user credentials 106A/106B/106C to the application 104, the application 104 receives the user credentials 106A/106B/106C of the user 108 and stores the user credentials 106A/106B/106C in a memory of the user device 102. In another embodiment, the application 104 stores the user credentials 106A/106B/106C on the database 112. In an alternative embodiment, the user credentials 106A/106B/106C can also be stored in the database 112 or any other remote device communicatively coupled with the user device 102. When the user credentials 106A/106B/106C of the user 108 are stored, the user 108 becomes a registered user or authenticated user of the application 104. Also, such user credentials 106A/106B/106C associated with the registered user 108 is referred to as stored/pre-stored user credentials. Thereinafter, the registered user 108 can access/use the application 104, one or more features of the application 104 and/or data stored at the database 112 using the network 110.

The present invention also encompasses the database 112 to generate at least one key/code for accessing/using the application 104 that is valid only for a specified period of time. Once the specified time period expires, then the database 112 again generates another key/code for accessing/using the application 104. Such key/code for the application 104 can also be generated based on a request from the user 108. The user 108 uses such key/code in the application to access the application 104, or unlock other features of the application 104, for a period of time. In one non-limiting example, the key/code is entered into a real estate lock access control application for enabling the application to open real estate lock boxes for a period of time.

Figure 1B:
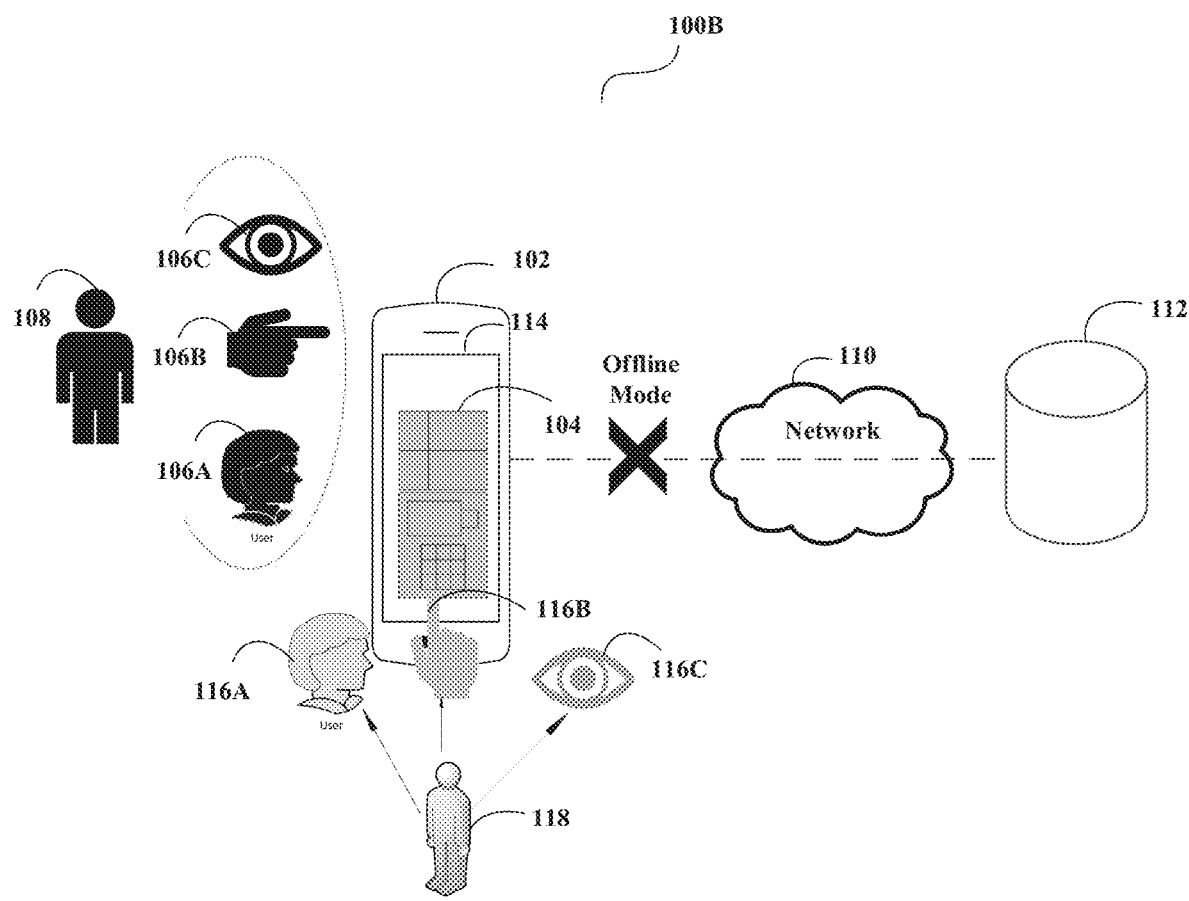
FIG. 1B is an exemplary system architecture illustrating access management of an application, according to an exemplary embodiment of the invention.

FIG. 1B depicts a system architecture 100B for managing access of an application 104 by controlling access of the application 104 to a registered user 108 or any different user 118, according to an exemplary embodiment of the invention.

Considering a situation where the different user 118 who is not registered with the application 104. As depicted in FIG. 1B, when the user 118 accesses/opens the application 104, in such a situation, the application 104 receives an indication that the user 118 is trying to access/open the application 104. Then, the application 104 determines whether the user device 102 is in an offline mode. In an embodiment, the offline mode associated with the user device 102 corresponds to an airplane mode or an internet switch-off mode or a network switch-off mode. Particularly, the offline mode associated with the user device 102 is the mode when the user 118 has prevented the user device 102 from connecting with the network 110 and thus, the user device 102 does not have any network connectivity. The airplane mode may be the one where the user 118 has enabled airplane tab/button in the user device 102. The internet switch-off mode may the mode where the user 118 has manually and intentionally turned-off the internet service in the user device 102 so that the user device 102 does not receive the internet. The network switch-off mode may be the mode where a network service provider is unable to provide internet/network service to the user device 102 in a particular area due to obstructions or poor signal strength.

Alternatively, the user device 102 may be in an online mode. The online mode associated with the user device 102 is the mode when the user 118 has enabled and connected the user device 102 with the network 110 and thus, the user device 102 has network connectivity. Alternatively, the user device 102 may be deemed to be in an online mode when all possible networks are enabled and functional but the user device 102 is actually not within network coverage, for example in the case of a cellular network. In other words, the user device 102 is not prevented from having a network connection. Additionally, the application 104 may determine whether the user device 102 is online or offline based on a policy as to whether it actually has an active connection versus just being allowed or disallowed from connecting.

As can be seen in the FIG. 1B, the application 104 determines that the user device 102 is in the offline mode when the user device 102 is not connected to the network 110. In this situation when the user device 102 is in the offline mode, the application 104 prompts the user 118 (say unregistered user) to input user credentials 116A/116B/116C. Then, the user 118 provides his/her user credentials 116A/116B/116C to the application 104 and thereby, the application 104 receives the user credentials 116A/116B/116C associated with the user 118. On receiving the user credentials 116A/116B/116C associated with the user 118, the application 104 validates the user credentials 116A/116B/116C by comparing the user credentials 116A/116B/116C associated with the user 118 with the pre-stored user credentials 106A/106B/106C (stored in the memory of the user device 102) associated with the registered user 108 of the application 104. Alternatively, such comparison of the user credentials 116A/116B/116C with the pre-stored user credentials 106A/106B/106C may be performed by an operating system of the user device 102.

In this instant scenario, the application 104 determines that the user credentials 116A/116B/116C associated with the user 118 do not match with the pre-stored user credentials 106A/106B/106C associated with the registered user 108 of the application 104. On determining that there is no match between the user credentials 116A/116B/116C associated with the user 118 and the pre-stored user credentials 106A/106B/106C associated with the registered user 108, the application 104 restricts/denies the access of the application 104 to the user 118. Thus, the access to the application in offline mode (say airplane mode or an internet switch-off mode or a network switch-off mode) is denied and the user is termed as an unauthorized/unregistered user.

Now, considering another situation where the registered user 108 tries to access/open the application 104 in the user device 102. In this situation, when the application 104 receives an indication that the registered user 108 is trying to access/open the application 104, the application 104 determines whether the user device 102 is in the offline mode. Subsequently, the application 104 determines the user device 102 is in the offline mode where the user device 102 is not connected to the network 110. In this situation when the user device 102 is in the offline mode, the application 104 prompts the registered user 108 to input user credentials 106A/106B/106C. The registered user 108 provides his/her user credentials 106A/106B/106C to the application 104 and thereby, the application 104 receives the user credentials 106A/106B/106C associated with the registered user 108. On receiving the user credentials 106A/106B/106C associated with the registered user 108, the application 104 validates the user credentials 106A/106B/106C by comparing the user credentials 106A/106B/106C associated with the pre-stored user credentials 106A/106B/106C.

Here, in this another scenario, the application 104 determines that the user credentials 106A/106B/106C associated with the registered user 108 matches with the pre-stored user credentials 106A/106B/106C. On determining that there is a match between the user credentials 106A/106B/106C associated with the registered user 108 and the pre-stored user credentials, the application 104 grants/allows the access of the application 104 to the registered user 108.

The present invention further encompasses displaying content of the application to the registered user 108 when the access of the application 104 is granted to the registered user 108. The user granted access to the application can further interact with the application to do the intended tasks.

Figure 2:
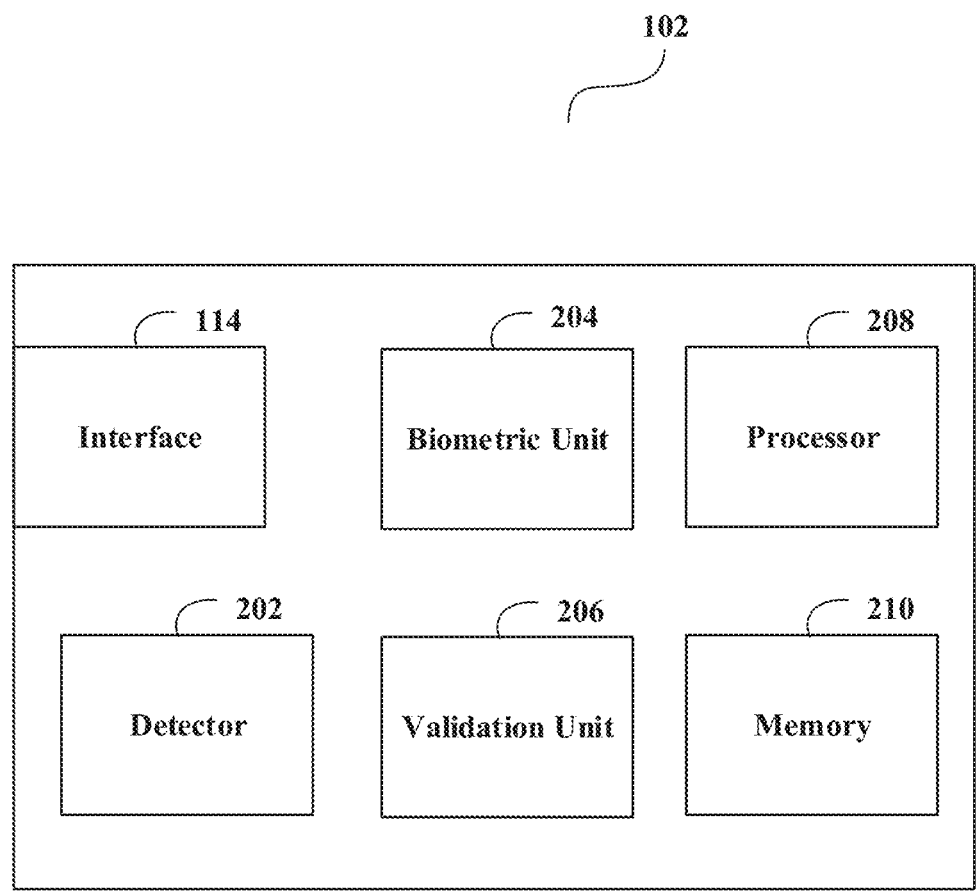
FIG. 2 is an exemplary block diagram of different components in a user device according to an exemplary embodiment of the invention

FIG. 2 depicts the various components of the user device 102, according to an embodiment of the invention. The user device 102 comprises, but is not limited to, the interface 114, a detector 202, a credentials unit 204, a validation unit 206, a processor 208 and a memory 210. The interface 114, the detector 202, the credentials unit 204, the validation unit 206, and the memory 210 are communicatively coupled with a processor 208 of the user device 102.

The interface 114 of the user device 102 is adapted to receive an indication that the user 118 or the registered user 108 is trying to access/open the application 104. Then, the interface 114 of the user device 102 is adapted to receive the indication to access the application 104. The detector 202 of the user device 102 is adapted to determine whether the user device 102 is in an offline mode on receiving said indication. When the detector 202 of the user device 102 determines that the user device 102 is in the offline mode, the interface 114 of the user device 102 is further adapted to prompt the user 118 or the registered user 108 to input user credentials. Subsequently, the user 118 or the registered user 108 inputs the user credentials using the credentials unit 204 of the user device 102. Once the credentials unit 204 receives the user credentials, the validation unit 206 of the user device 102 is adapted to validate the received user credentials by comparing the user credentials associated with the user 118 or the registered user 108 with the pre-stored user credentials. As discussed above, such pre-stored user credentials are stored in the memory 210 of the user device 102. The validation unit 206 of the user device 102 is also adapted to validate the user credentials of the user 118 or the registered user 108 with the pre-stored user credentials and thereby control access of the application 104 to the user 118 or the registered user 108 based on said validation. In one embodiment, the validation unit 206 of the user device 102 is also adapted to grant/allow access of the application 104 when the user credentials associated with the user 118 or the registered user 108 matches with the pre-stored user credentials. In an alternative embodiment, the validation unit 206 is adapted to deny/restrict access of the application 104 when the user credentials associated with the user 118 or the registered user 108 do not match with the pre-stored user credentials. Specifically, the pre-stored user credentials are associated with a registered user 108 of the application.

The interface 114 of the user device 102 is also adapted to display content of the application 104 to the user 118 or the registered user 108 in an event the access of the application 104 is granted to the user 118 or the registered user 108.

The interface 114, credentials unit 204 and the validation unit 206 of the user device 102 are also configured to register any user by prompting the user to input user credentials and receive the user credentials from the user. Such user credentials is stored in the memory 210 of the user device 102 and referred for future authentication of the users when the user tries to access/open the application 104 in the offline mode.

In an embodiment of the invention, the credentials unit 204 of the user device 102 may be a fingerprint sensing unit, or a camera unit for receiving an image of a face or iris of the user or any such credentials unit 204 that is obvious to a person skilled in the art. In an embodiment of the invention, the interface 114 of the user device 102 may be a display or a screen of the user device 102 for rendering the application 104. Such display can be a touch display with a keyboard. Further, the interface 114, the detector 202, the credentials unit 204, the validation unit 206, the processor 208 and the memory 210 may be a software or a hardware or a combination of the software and the hardware. Each of these blocks of the user device 102 are communicatively coupled with each other to perform the functionalities as described herein.

Figure 3:
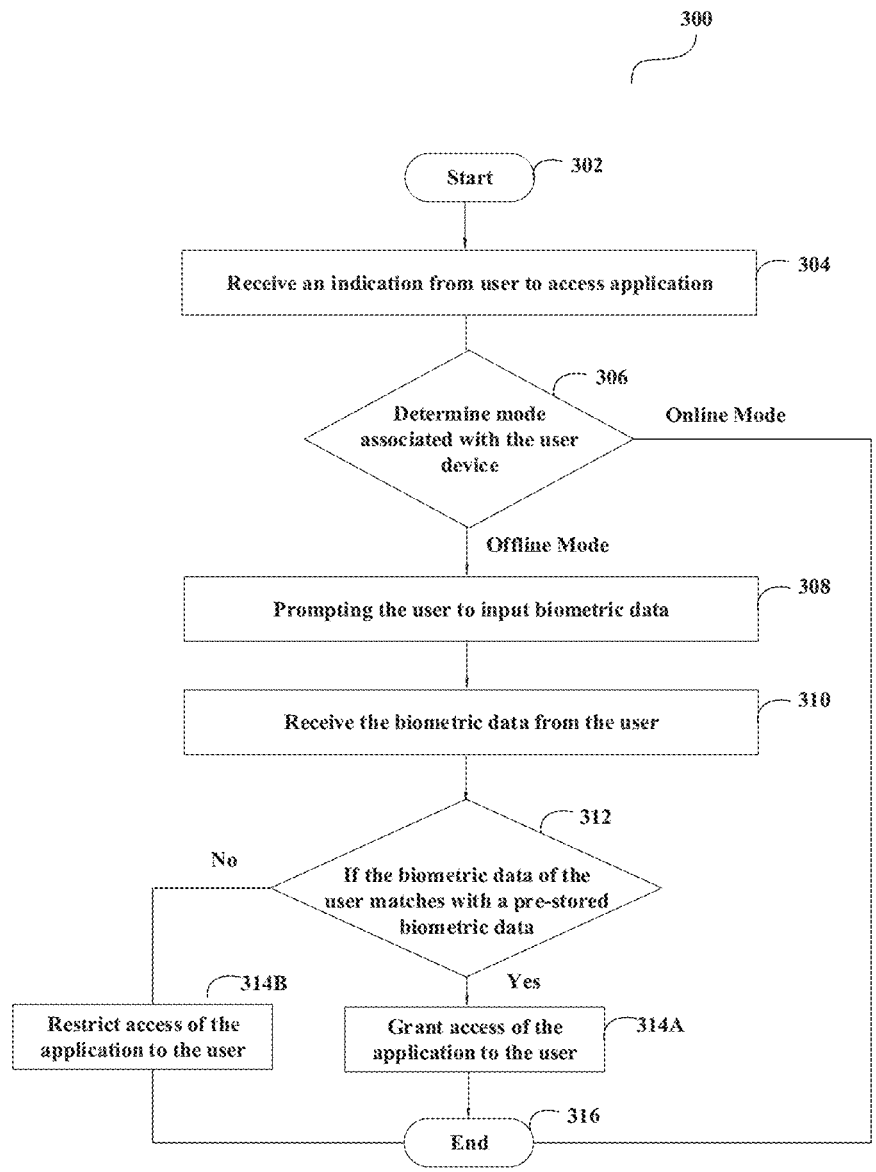
FIG. 3 is an exemplary flowchart illustrating a method to perform the invention according to an exemplary embodiment of the invention.

FIG. 3 depicts a flowchart outlining the features of the invention in an exemplary first embodiment of the invention. The method flowchart 300 describes a method being performed for enabling the invention. The method flowchart 300 starts at step 302.

At step 304, an indication is received from the user 118 or the registered user 108 to access/open the application 104. The user 108/118 may access the application 104 using the interface 114 of the user device 102. The application 104 is stored in the memory 210 of the user device 102.

At step 306, a determination is performed whether the user device 102 is in an offline mode when the indication is received from the user 118 or the registered user 108. In case the user device 102 is in the offline mode, then the method flowchart 300 moves to step 308, otherwise, the method flowchart 300 ends at step 316 if the user device 102 is in the online mode.

At step 308, if the user device 102 is in the offline mode, a prompt is provided to the user 118 or the registered user 108 to input user credentials.

At step 310, the user credentials of the user 118 or the registered user 108 is received when the user 118 or the registered user 108 inputs the user credentials.

At step 312, the user credentials as inputted by the user 118 or the registered user 108 is validated by comparing the inputted user credentials with pre-stored user credentials stored in the memory 210 of the user device 102. In case, the user credentials inputted by the user 118 or the registered user 108 match with the pre-stored user credentials, then the method flowchart 300 moves to step 314A, otherwise, the method flowchart 300 ends at step 314B if the user credentials inputted by the user 118 or the registered user 108 do not match with the pre-stored user credentials. In this situation, an access of the application is denied/restricted to the user 118 or the registered user 108. The pre-stored user credentials is associated with the registered user 108 of the application 104.

At step 314A, an access of the application is granted when the user credentials inputted by the user 118 or the registered user 108 matches with the pre-stored user credentials. Then, the method flowchart 300 ends at step 316. Also, as discussed above, the database 112 provides key/code to the registered user 108 for accessing/using the application 104 that is valid only for a specified period of time.

The present invention encompasses a system 100A/100B comprising a database 112 communicatively coupled with the user device 102. The user device is configured to register one or more users 108 with the application 104 by prompting the one or more users 108 to input user credentials and to store the user credentials of the registered users 108 in the memory 210 of the user device 102. The user device 102 is also configured to determine whether the user device 102 is in an offline mode on receiving an indication from the one or more users 108/118 to access the application 104. The user device 102 prompts the one or more users 108/118 to input user credentials if the user device 102 is in the offline mode. Further, the user device 102 is configured to control access of the application 104 to the one or more users 108/118 based on a validation of the user credentials of the one or more users 108/118 with the stored user credentials of the registered users 108.

The present invention provides the following technical advantages over the existing methods and systems: a) Provide additional security feature in application/s when the user device is in an offline mode, b) Restrict/deny unauthorized access of the applications to the users when the user device is in the offline mode, c) Prevent content of the application from unauthorized/unregistered users, d) Prevent misuse of the application/s by the unauthorized/unregistered users, e) Enable authentic user of the application to register with the application, and f) Using user credentials of the registered user for providing additional security to the application.

The embodiment of the invention discussed herein is exemplary and various modification and alterations to a person skilled in the art are within the scope of the invention.

In one embodiment of the invention, the invention can be operated using the one or more computer readable devices. The one or more computer readable devices can be associated with the user device 102. The computer readable medium is configured to receive an indication from a user 118 to access an application 104. The computer readable medium is further configured to determine whether the user device 102 is in an offline mode. The computer readable medium is also configured to prompt the user 118 to input user credentials if the user device 102 is in the offline mode. The user device 102 receives the user credentials from the user 118 in response to the prompting and validates the user credentials of the user 118 with a pre-stored user credentials of a registered user 108. And, then the user device 102 controls access of the application to the user 118 based on said validation. As discussed above, the user device 102 is also adapted to grant/allow access of the application 104 when the user credentials associated with the user 118 matches with the pre-stored user credentials. In an alternative embodiment, the user device 102 denies/restricts access of the application 104 when the user credentials associated with the user 118 do not match with the pre-stored user credentials.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   receiving, at a user device executing an application, a key/code configured to enable the application to open a real estate lock box, the key/code being valid for a period of time having an expiration;
   receiving an indication from a user to access the application;
   determining whether the user device is in an offline mode;
   prompting the user to input user credentials if the user device is in the offline mode;
   receiving the user credentials from the user in response to the prompting;
   validating the user credentials with pre-stored user credentials; and
   controlling access of the application to the user based on said validation.

2. The method of claim 1, wherein the offline mode of the user device is an airplane mode or an internet switch-off mode or a network switch-off mode.

3. The method of claim 1, wherein the user credentials include biometric data, unique identifiers, or password.

4. The method of claim 1, wherein access of the application is granted to the user when the user credentials of the user match with the pre-stored user credentials.

5. The method of claim 1, wherein access of the application is restricted to the user when the user credentials do not match with the pre-stored user credentials.

6. The method of claim 1, further comprising, displaying content of the application to the user when the access of the application is granted to the user.

7. The method of claim 1, wherein the pre-stored user credentials are associated with a registered user of the application.

8. The method of claim 1, wherein a new user is registered for the application by:
   prompting the new user to input user credentials;
   receiving the user credentials from the new user in response to the prompting; and
   storing the user credentials of the new user in a memory of the user device.

9. A user device comprising:
   a processor executing an application, the application configured to receive a key/code configured to enable the application to open a real estate lock box, the key/code being valid for a period of time having an expiration;
   an interface adapted to receive an indication from a user to access the application;
   a detector adapted to determine whether the user device is in an offline mode on receiving said indication;
   a credentials unit adapted to receive user credentials if the user device is in the offline mode; and
   a validation unit adapted to validate the user credentials of the user with pre-stored user credentials and thereby control access of the application to the user based on said validation.

10. The user device of claim 9, wherein the offline mode of the user device is an airplane mode or an internet switch-off mode or a network switch-off mode.

11. The user device of claim 9, wherein the validation unit is configured to grant access of the application to the user when the user credentials of the user match with the pre-stored user credentials.

12. The user device of claim 9, wherein the validation unit is configured to restrict access of the application to the user when the user credentials of the user do not match with the pre-stored user credentials.

13. The user device of claim 9, further comprising, wherein the interface is adapted to display content of the application to the user when the access of the application is granted to the user.

14. The user device of claim 9, wherein the pre-stored user credentials are associated with a registered user of the application.

15. A non-transitory computer readable medium storing instructions which are executed by one or more processors, the one or more processors configured to:
   receive, at a user device executing an application, a key/code configured to enable the application to open a real estate lock box, the key/code being valid for a period of time having an expiration;
   receive an indication from a user to access the application;
   determine whether the user device is in an offline mode;
   prompt the user to input user credentials if the user device is in the offline mode;
   receive the user credentials from the user in response to the prompting;
   validate the user credentials of the user with a pre-stored user credentials; and
   control access of the application to the user based on said validation.

16. The computer readable medium of claim 15, wherein the offline mode of the user device is an airplane mode or an internet switch-off mode or a network switch-off mode.

17. The computer readable medium of claim 15, wherein access of the application is granted to the user when the user credentials match with the pre-stored user credentials.

18. The computer readable medium of claim 15, wherein access of the application is restricted to the user when the user credentials do not match with the pre-stored user credentials.

19. The computer readable medium of claim 15, further comprising, displaying content of the application to the user when the access of the application is granted to the user.

20. The computer readable medium of claim 15, wherein the pre-stored user credentials are associated with a registered user of the application.

* * * * *